(12) United States Patent
Kuroba et al.

(10) Patent No.: US 11,827,302 B2
(45) Date of Patent: Nov. 28, 2023

(54) STRADDLE TYPE VEHICLE, METHOD FOR CONTROLLING STRADDLE TYPE VEHICLE, AND STORAGE MEDIUM

(71) Applicant: HONDA MOTOR CO., LTD., Tokyo (JP)

(72) Inventors: Yoshiyuki Kuroba, Tokyo (JP); Kazuki Akami, Tokyo (JP); Hiroshi Maeda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 17/699,720

(22) Filed: Mar. 21, 2022

(65) Prior Publication Data

US 2022/0212743 A1 Jul. 7, 2022

Related U.S. Application Data

(63) Continuation of application No. PCT/JP2019/038562, filed on Sep. 30, 2019.

(51) Int. Cl.
*B62J 50/22* (2020.01)
*B62J 45/412* (2020.01)
(Continued)

(52) U.S. Cl.
CPC ............. *B62J 50/22* (2020.02); *B62J 45/412* (2020.02); *B62J 45/4151* (2020.02);
(Continued)

(58) Field of Classification Search
CPC ....................................................... B62J 50/22
See application file for complete search history.

(56) References Cited

U.S. PATENT DOCUMENTS 4,746,206 A 5/1988 Kusztos et al.
2006/0250224 A1 11/2006 Steffel et al.
(Continued)

FOREIGN PATENT DOCUMENTS

DE 10 2013 218 458 A1 3/2015
JP 2002-260198 A 9/2002
(Continued)

OTHER PUBLICATIONS

International Search Report dated Dec. 3, 2019, issued in counterpart Application No. PCT/JP2019/038562, with English Translation. (5 pages).

(Continued)

*Primary Examiner* — Joseph H Feild
*Assistant Examiner* — Pameshanand Mahase
(74) *Attorney, Agent, or Firm* — WHDA, LLP

(57) ABSTRACT

A straddle type vehicle has a rear detection unit configured to detect an object in a detection region behind a vehicle, and a notification unit configured to notify a driver when the object is detected by the rear detection unit. The straddle type vehicle comprises: an acquisition unit configured to acquire travel information of the straddle type vehicle; an identification unit configured to identify a turning direction and a turning radius of the straddle type vehicle on the basis of the travel information; and a change unit configured to change straight-ahead-travel detection region settings for the rear detection unit on the basis of the turning direction and turning radius.

11 Claims, 7 Drawing Sheets

(51) Int. Cl.
*G01S 13/931* (2020.01)
*B62J 45/41* (2020.01)
*B62J 27/00* (2020.01)
*B62J 45/415* (2020.01)

(52) U.S. Cl.
CPC ..... *G01S 13/931* (2013.01); *G01S 2013/9315* (2020.01); *G01S 2013/93272* (2020.01)

(56) References Cited

U.S. PATENT DOCUMENTS

| | | | | |
|---|---|---|---|---|
| 2014/0085124 | A1* | 3/2014 | Dusik | G08G 5/04 |
| | | | | 342/29 |
| 2015/0329072 | A1* | 11/2015 | Freienstein | G01S 13/86 |
| | | | | 701/49 |
| 2018/0217255 | A1* | 8/2018 | Kim | B60W 50/14 |
| 2018/0218229 | A1 | 8/2018 | Murillo Amaya et al. | |
| 2018/0326906 | A1* | 11/2018 | Savaresi | B62J 45/41 |
| 2018/0347990 | A1* | 12/2018 | Mishina | B60W 30/12 |

FOREIGN PATENT DOCUMENTS

| | | | |
|---|---|---|---|
| JP | 2006-519427 | A | 8/2006 |
| JP | 2013-60128 | A | 4/2013 |
| JP | 2017-39487 | A | 2/2017 |
| JP | 2018-12439 | A | 1/2018 |

OTHER PUBLICATIONS

Office Action dated Aug. 1, 2022, issued in counterpart IN Application No. 202247015343, with English Translation. (5 pages).

\* cited by examiner

STRADDLE TYPE VEHICLE, METHOD FOR CONTROLLING STRADDLE TYPE VEHICLE, AND STORAGE MEDIUM

CROSS-REFERENCE TO RELATED APPLICATION(S)

This application is a continuation of International Patent Application No. PCT/JP2019/038562 filed on Sep. 30, 2019, the entire disclosure of which is incorporated herein by reference.

TECHNICAL FIELD

The present invention relates to a straddle type vehicle, a method for controlling the straddle type vehicle, and a storage medium.

BACKGROUND ART

Japanese Patent Laid-Open No. 2006-519427 discloses a technology that detects a situation behind a self-vehicle and notifies a driver of the presence of another vehicle by flashing a lamp or the like when the other vehicle is detected in a rear detection region.

However, in the configuration of Japanese Patent Laid-Open No. 2006-519427, since the settings of the rear detection region are fixed during straight-ahead traveling and turning, a region (blind region) that is difficult for the driver to visually recognize may occur in the rear detection region depending on the turning direction and turning radius of the vehicle.

In view of the problems in the prior art, the present invention provides a technology capable of changing detection region settings for a rear detection unit on the basis of the turning direction and turning radius of a straddle type vehicle.

SUMMARY OF THE INVENTION

According to one aspect of the present invention, there is provided a straddle type vehicle having a rear detection unit configured to detect an object in a detection region behind a vehicle, and a notification unit configured to notify a driver when the object is detected by the rear detection unit, the straddle type vehicle comprising: an acquisition unit configured to acquire travel information of the straddle type vehicle; an identification unit configured to identify a turning direction and a turning radius of the straddle type vehicle on the basis of the travel information; and a change unit configured to change straight-ahead-travel detection region settings for the rear detection unit on the basis of the turning direction and turning radius, wherein the change unit changes a shape of the detection region set when traveling straight ahead, in the detection region of the rear detection unit, to a curved region having a curved shape according to the turning direction and the turning radius.

According to another aspect of the present invention, there is provided a method for controlling a straddle type vehicle having a rear detection unit configured to detect an object in a detection region behind a vehicle, and a notification unit configured to notify a driver when the object is detected by the rear detection unit, the method comprising: an acquisition step of acquiring, by an acquisition unit, travel information of the straddle type vehicle; an identification step of identifying, by an identification unit, a turning direction and a turning radius of the straddle type vehicle on the basis of the travel information; a change step of changing, by a change unit, straight-ahead-travel detection region settings for the rear detection unit on the basis of the turning direction and turning radius; and a pattern acquisition step of acquiring a region pattern from a storage unit for storing the region pattern according to the turning direction and turning radius, wherein in the change step, a shape of the detection region set when traveling straight ahead, in the detection region of the rear detection unit, is changed to a region having a shape that is obtained by removing the region pattern from the shape of the detection region.

According to the present invention, it is possible to change detection region settings for a rear detection unit on the basis of the turning direction and turning radius of a straddle type vehicle.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Hereinafter, embodiments of the present invention will be described with reference to the drawings. The components described in these embodiments are merely examples and are not limited by the following embodiments.

First Embodiment (Configuration of Motorcycle (Straddle Type Vehicle))

Figure 1:
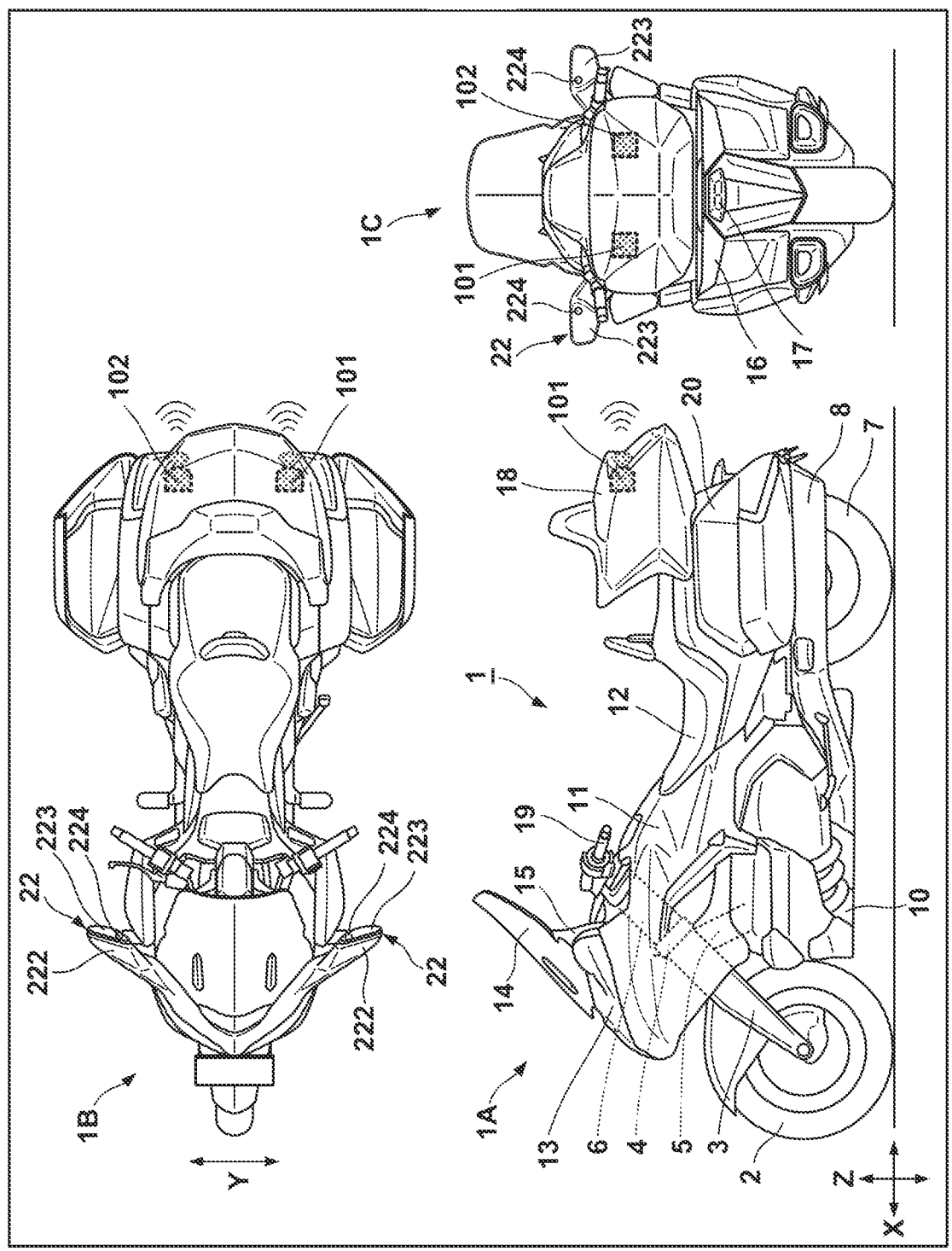
FIG. 1 exemplarily shows a configuration of a motorcycle (straddle type vehicle) according to an embodiment.

FIG. 1 exemplarily shows a configuration of a straddle type vehicle 1 according to an embodiment of the present invention. FIG. 1A is a left side view of the straddle type vehicle 1, FIG. 1B is a top view of the straddle type vehicle 1, and FIG. 1C is a rear view of the straddle type vehicle 1. In FIG. 1, the X direction indicates the front-and-rear direction of the straddle type vehicle 1, and the Y direction indicates the vehicle width direction of the straddle type vehicle 1. In addition, the Z direction indicates the vertical direction of the straddle type vehicle 1.

In the straddle type vehicle 1, a front wheel 2 is pivotally supported by the lower ends of a pair of left and right front forks 3. The upper portions of the left and right front forks 3 are steerably pivoted to a head pipe 6 at the front end of a vehicle body frame 5, with a steering stem 4 interposed therebetween.

The straddle type vehicle 1 is steered by a handlebar 19 attached to the head pipe 6. Handle grips gripped by a driver are provided at left and right ends of the handlebar 19. In addition, the handlebar 19 is provided with a brake lever, a clutch lever, and the like (not shown) adjacent to the left and right handle grips. The rear wheel 7 of the straddle type vehicle 1 is pivotally supported by the rear end of an arm 8 that extends in the front-and-rear direction at the lower rear side of the vehicle body. The front end of the arm 8 is pivotably supported in a vertically swingable manner at an intermediate portion of the vehicle body frame 5 in the front-and-rear direction.

An engine (internal combustion engine) 10, which is the prime mover of the straddle type vehicle 1, is mounted on the vehicle body frame 5. A fuel tank 11 is disposed above the engine 10, and a seat 12 on which the driver of the motorcycle 1 sits is disposed behind the fuel tank 11. A trunk case 18 for storing articles is disposed behind the seat 12 on which the driver sits. A front cowl 13 supported by the vehicle body frame 5 is mounted to the front portion of the vehicle body. A screen 14 is provided on the upper front side of the front cowl 13. A meter panel 15 is disposed inside the front cowl 13 and the screen 14. The meter panel 15 displays various information relating to the state of the vehicle, such as vehicle speed or engine speed. A tail winker 16 and a tail light 17 are provided in the rear of the straddle type vehicle 1.

In the straddle type vehicle 1, radars 101 and 102 are arranged as a rear detection unit 100 that detects an object in a detection region behind the vehicle. In the example shown in FIG. 1, the radars 101 and 102 are arranged at left and right rear positions, respectively, of the straddle type vehicle 1. The radar 101 detects an object in a detection region behind the left side of the straddle type vehicle 1. In addition, the radar 102 detects an object in a detection region behind the right side of the straddle type vehicle 1.

Note that the arrangement of the rear detection unit 100 shown in FIG. 1 is exemplary, and a single radar may be disposed in the center of the rear of the straddle type vehicle 1, or two radars may be arranged in the left and right rear, and one radar may be disposed in the center of the rear. The type of sensor in the rear detection unit 100 may be, for example, a LIDAR in addition to the radar. Furthermore, in the example of FIG. 1, the rear detection unit 100 is disposed in the trunk case 18, but the location of rear detection unit 100 is not limited to this position. For example, the inside of the saddlebag 20 of the straddle type vehicle 1 can also be a location for the rear detection unit 100.

Left and right mirror units 22 are provided in the vehicle width direction (y direction) of the straddle type vehicle 1. Each of the left and right mirror units 22 includes a mirror housing 222, a side mirror (mirror surface) 223, and a notification display unit 224. The mirror housing 222 is a hollow body having an opening toward the rear, and the side mirror (mirror surface) 223 is attached to the mirror housing 222 so as to close the opening. The driver can visually recognize the left and right rear sides with the side mirrors 223.

The straddle type vehicle 1 according to the present embodiment has a notification unit that notifies the driver when an object is detected by the rear detection unit 100. The notification display unit 224 of the mirror unit 22 functions as a notification unit that notifies the driver. The notification display unit 224 is a light-emitting device including a light-emitting element such as an LED, a substrate that supports the light-emitting element, and a cover lens that covers the front of the notification display unit 224. By forming an opening in a part of the side mirror 223 and placing the notification display unit 224 in the opening, the notification display unit 224 can be provided in the mirror unit 22.

Note that the arrangement of the notification display unit 224 shown in FIG. 1 is exemplary, and is not limited to this position. For example, the meter panel 15 can also be a location for the notification display unit 224.

(Configuration of Detection Region Control Device 200)

Figure 2:
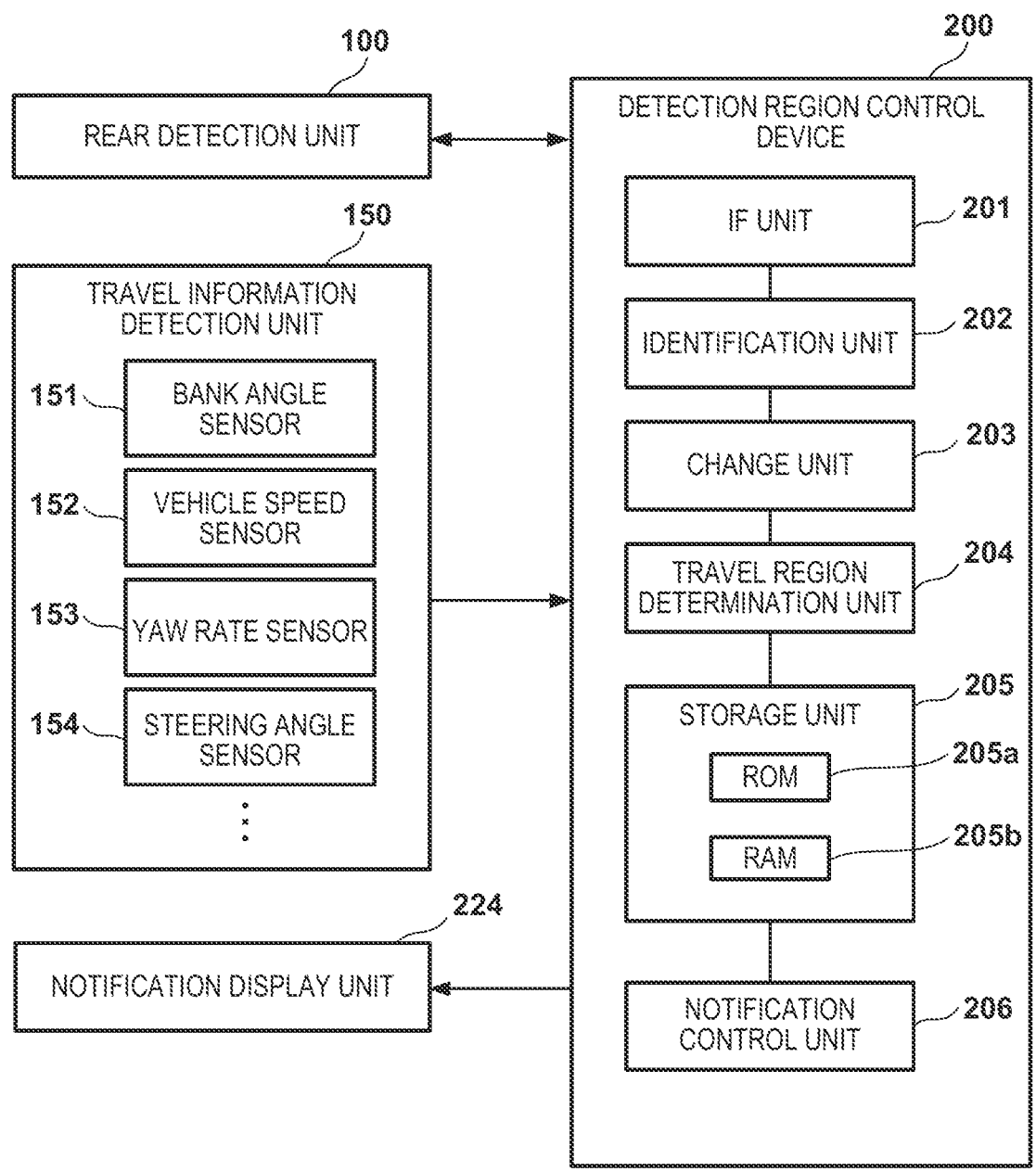
FIG. 2 is a block diagram showing a functional configuration of a detection region control device.

FIG. 2 is a block diagram showing a functional configuration of a detection region control device 200 according to the present embodiment. The straddle type vehicle 1 is provided with the rear detection unit 100, a travel information detection unit 150, and the detection region control device 200. The travel information detection unit 150 detects travel information (bank angle, vehicle speed, yaw rate, and steering angle) indicating the travel state of the straddle type vehicle 1. The detection region control device 200 can change detection region settings for the rear detection unit 100 on the basis of the travel information indicating the travel state of the straddle type vehicle 1.

The detection region control device 200 has an interface unit 201 (IF unit), an identification unit 202, a change unit 203, a travel region determination unit 204, a storage unit 205 (ROM 205a, RAM 205b), and a notification control unit 206. Here, the functions of respective parts of the identification unit 202, the change unit 203, and the travel region determination unit 204, which are functional configurations that perform calculation and determination processing are configured using, for example, one or more central processing units (CPUs) or programs read from the storage unit 205. The functional configurations of the respective parts may be configured by an integrated circuit or the like as long as they perform similar functions.

(Interface Unit 201)

The interface unit 201 (IF unit) functions as an interface between the rear detection unit 100, the travel information detection unit 150, and the notification display unit 224, and the interface unit 201 includes, for example, a communication interface capable of data communication using a predetermined communication protocol. Here, the communication protocol includes, for example, K-Line communication, CAN communication, and serial communication.

The interface unit 201 can acquire travel information (bank angle, vehicle speed, yaw rate, and steering angle) indicating the travel state of the straddle type vehicle 1 detected by the travel information detection unit 150.

The travel information detection unit 150 is capable of detecting travel information indicating the travel state of the straddle type vehicle 1, and the travel information detection unit 150 includes, for example, a plurality of types of sensors (such as a bank angle sensor 151, a vehicle speed sensor 152, a yaw rate sensor 153, and a steering angle sensor 154) mounted in the straddle type vehicle 1.

Figure 3:
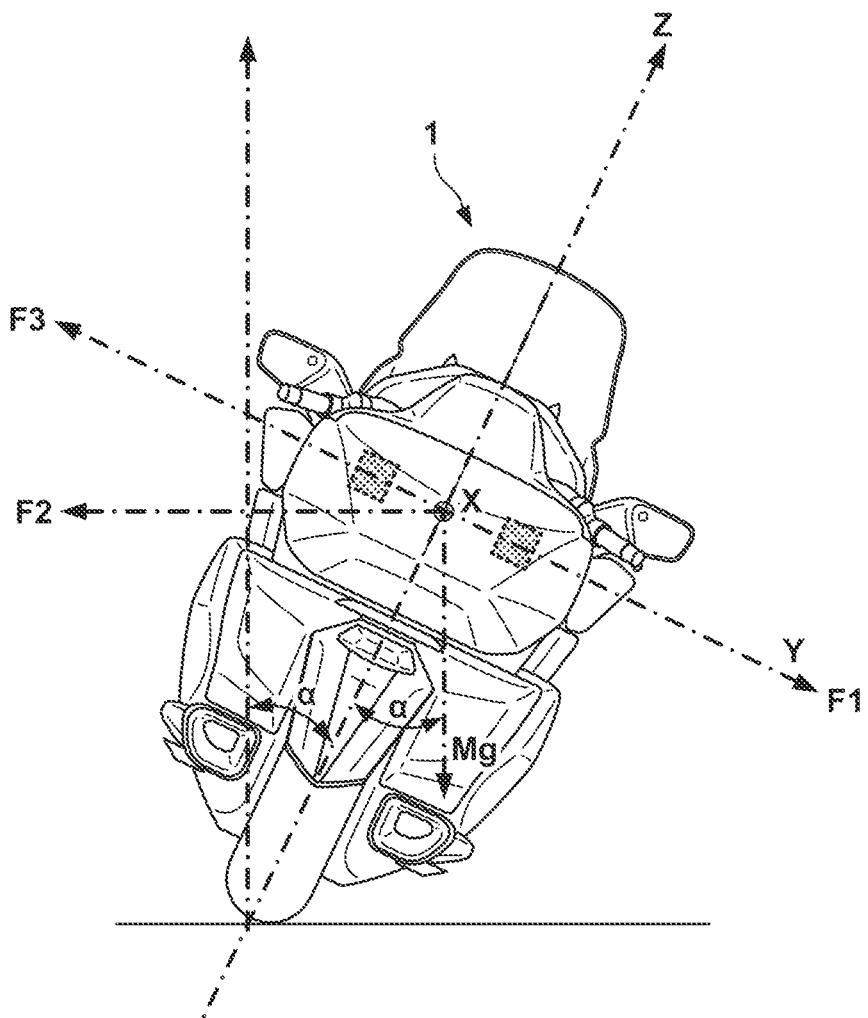
FIG. 3 illustrates an example of calculation for obtaining a turning radius.

The bank angle sensor 151 is a sensor that detects the inclination angle (bank angle $\alpha$: FIG. 3) of the straddle type vehicle 1. Note that a G sensor can also be used instead of the bank angle sensor 151. The G sensor (acceleration sensor) is a sensor that measures the acceleration (rate of change in speed) of the straddle type vehicle 1, and is capable of measuring acceleration in three axial (X-axis, Y-axis, and Z-axis) directions. For example, as shown in FIG. 3, the inclination angle of the straddle type vehicle 1 can be detected on the basis of the measurement value of the G sensor in the Y direction.

The vehicle speed sensor 152 is a sensor that detects the travel speed of the straddle type vehicle 1, and detects, for example, a rotational speed (speed) corresponding to the number of wheel revolutions of the straddle type vehicle 1. In addition, the yaw rate sensor 153 detects the yaw rate (rotational angular velocity) of the straddle type vehicle 1. The steering angle sensor 154 detects the steering angle of the handlebar 19 of the straddle type vehicle 1. The bank angle sensor 151, the vehicle speed sensor 152, the yaw rate sensor 153, and the steering angle sensor 154 repeatedly execute detection when the ignition of the straddle type vehicle 1 is turned on.

(Identification Unit 202)

The identification unit 202 identifies the turning direction and turning radius of the straddle type vehicle 1 on the basis of the travel information (yaw rate, steering angle, bank angle, and vehicle speed) of the straddle type vehicle 1 acquired by the interface unit 201 (IF unit).

The identification unit 202 identifies the turning direction on the basis of, for example, the yaw rate or the steering angle among the travel information. In addition, the identification unit 202 identifies the turning radius in the turning direction on the basis of, for example, the bank angle and the vehicle speed among the travel information.

Here, FIG. 3 illustrates an example of calculation for obtaining a turning radius. For example, as shown in FIG. 3, when the masses of the straddle type vehicle 1 and the driver are virtually M, the gravitational acceleration is g, and the bank angle (inclination angle) of the straddle type vehicle 1 is $\alpha$, the force (F1) in the direction to incline the straddle type vehicle 1 is $F1=Mg\cdot\sin\alpha$.

The centrifugal force F2 acting when the straddle type vehicle 1 turns with a turning radius r and vehicle speed V is $M\cdot(V^2/r)$. In addition, the force (F3) acting in the direction to raise the straddle type vehicle 1 when the straddle type vehicle 1 turns is $F3=F2\cdot\cos\alpha$.

Since the force F1 in the direction to incline the straddle type vehicle 1 and the force F3 acting in the direction to raise the straddle type vehicle 1 are balanced, the relationship of $Mg\cdot\sin\alpha=M(V^2/r)\cdot\cos\alpha$ is established.

The identification unit 202 can acquire the turning radius by sequentially executing calculation processing based on the relational expression, on the travel route. In the calculation processing, the identification unit 202 can acquire the bank angle $\alpha$ as the detection result of the bank angle sensor 151 and the vehicle speed V as the detection result of the vehicle speed sensor 152, and the identification unit 202 is capable of identifying the turning radius r in the turning direction as $r=V^2/(g\cdot\tan\alpha)$ on the basis of the bank angle $\alpha$ and the vehicle speed V.

In the above relational expression, the turning radius r is identified using the detection results of the bank angle sensor 151 and the vehicle speed sensor 152, but the calculation based on the above relational expression is an example and is not limited to this example. For example, the turning radius r can also be identified using the detection result (bank angle (inclination angle): $\alpha$) of the bank angle sensor 151 and the detection result (rotational angular speed $\omega$) of the yaw rate sensor 153.

(Change Unit 203)

When the turning direction and turning radius of the straddle type vehicle 1 are identified by the identification unit 202, the change unit 203 changes straight-ahead-travel detection region settings for the rear detection unit 100 on the basis of the turning direction and the turning radius. The change unit 203 changes the shape of a detection region set when traveling straight ahead, in the detection region of the rear detection unit 100, to a curved region having a curved shape according to the turning direction and the turning radius.

The identification unit 202 described above identifies the turning radius in the turning direction acquired on the basis of the bank angle and the vehicle speed as the curvature radius of the curved region. The identification unit 202 acquires an average bank angle and an average vehicle speed within a set time on the basis of the bank angles and vehicle speeds sequentially acquired within the set time. The identification unit 202 can correct the curvature radius of the curved region on the basis of the average bank angle and the average vehicle speed. This makes it possible to correct the settings of the curved region, which is the detection region of the rear detection unit, according to the turning state.

Figure 4:
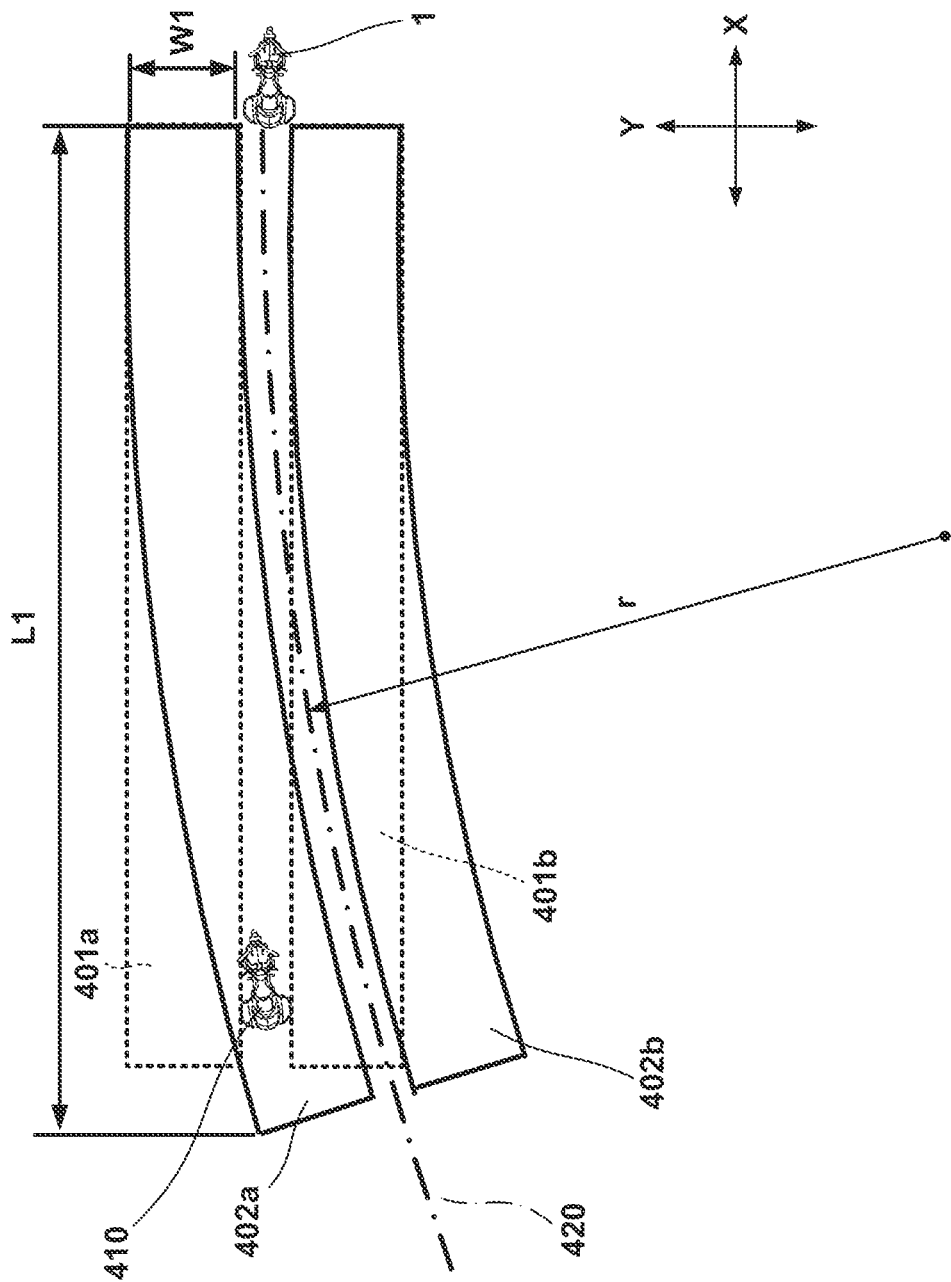
FIG. 4 illustrates the deformation processing of a detection region by a change unit.

FIG. 4 illustrates the deformation processing of a detection region by the change unit 203. FIG. 4 shows an example in which the radars 101 and 102 are arranged on the left and right as the rear detection unit 100 of the straddle type vehicle 1. Note that the arrangement of the radars in FIG. 4 is exemplary, and a configuration in which a single radar is disposed in the rear center of the straddle type vehicle 1 can be similarly applied.

The detection region of the rear detection unit 100 has a two-dimensional spread. In the example of FIG. 4, the shape of a detection region (401a, 401b) set when traveling straight ahead, in the detection region of the rear detection unit 100, is modeled as a rectangular region shape for simplification.

The detection regions 401a and 401b indicated by broken lines are the detection regions (hereinafter also referred to as the "detection regions before change") set when traveling straight ahead, in the detection region of the rear detection unit 100, and the detection region 401a before change corresponds to the detection region behind the left side of the straddle type vehicle 1 detected by the radar 101. In addition, the detection region 401b before the change corresponds to the detection region behind the right side of the straddle type vehicle 1 detected by the radar 102.

The change unit 203 changes the shape of the detection region before the change to a curved region (hereinafter also referred to as the "detection region after the change") having a curved shape according to the turning direction and the turning radius. The regions indicated by solid lines indicate the detection regions after the change by the change unit 203, and a curved region 402a after the change corresponds to the detection region behind the left side of the straddle type vehicle 1 detected by the radar 101. In addition, the curved region 402b after the change corresponds to the detection region behind the right side of the straddle type vehicle 1 detected by the radar 102.

The example of FIG. 4 shows an example of the straddle type vehicle 1 turning to the right, and the turning radius in the turning trajectory 420 is r. The change unit 203 changes straight-ahead-travel detection region settings (detection region (401a, 401b) set in a rectangular shape) for the rear detection unit 100 on the basis of the turning direction and the turning radius of the straddle type vehicle 1. That is, the change unit 203 changes the shape of the detection region (rectangular detection region) set when traveling straight ahead, in the detection region of the rear detection unit 100, to the curved region (402a, 402b) having a curved shape according to the turning direction (right turn) and the turning radius (r).

In FIG. 4, another vehicle 410 traveling behind the straddle type vehicle 1 (self-vehicle) is traveling outside the detection regions 401a and 401b before the change, and therefore is not detected by the rear detection unit 100. However, if the shape of the detection region is changed to a curved region having a curved shape according to the turning direction and the turning radius, the other vehicle 410 is detected by the rear detection unit 100 because the other vehicle 410 is traveling in the curved region 402a after the change. In this manner, by changing straight-ahead-travel detection region settings for the rear detection unit 100 on the basis of the turning direction and the turning radius of the straddle type vehicle, it is possible to prevent detection omission and erroneous detection.

(Travel Region Determination Unit 204)

On the basis of the comparison between the vehicle speed of the straddle type vehicle 1 and a threshold speed, the travel region determination unit 204 determines whether the straddle type vehicle 1 is traveling at a high speed equal to or higher than the threshold speed, or at a low speed less than the threshold speed. The change unit 203 changes the size of the curved region (402a, 420b in FIG. 4) on the basis of the determination result of the travel region determination unit 204.

If the straddle type vehicle 1 is traveling at a high speed, the change unit 203 changes (enlarges) the size of the curved region by increasing at least one of the length of the curved region in the front-and-rear direction, corresponding to the front-and-rear direction (X direction) of the straddle type vehicle 1, and the width of the curved region corresponding to the vehicle width direction (Y direction) of the straddle type vehicle 1.

For example, if the vehicle speed V of the straddle type vehicle 1 detected by the vehicle speed sensor 152 is equal to or higher than the threshold speed Vth (V≥Vth), the size of the curved region is changed (enlarged) by increasing at least one of the length (L1 in FIG. 4) of the curved region in the front-and-rear direction and the width (W1 in FIG. 4) of the curved region according to the vehicle speed V. In this case, every time the vehicle speed V increases by a predetermined speed, the change unit 203 increases either the length of the curved region in the front-and-rear direction or the width of the curved region by a predetermined value to change (enlarge) the size of the curved region. This enables detection in a wide detection region and enables detection suitable for high-speed traveling.

In addition, if the straddle type vehicle 1 is traveling at a low speed, the change unit 203 changes (reduces) the size of the curved region by shortening at least one of the length of the curved region in the front-and-rear direction, corresponding to the front-and-rear direction (X direction) of the straddle type vehicle 1, and the width of the curved region corresponding to the vehicle width direction (Y direction) of the straddle type vehicle 1.

For example, if the vehicle speed V of the straddle type vehicle 1 detected by the vehicle speed sensor 152 is less than the threshold speed Vth (V<Vth), the size of the curved region is changed (reduced) by shortening at least one of the length (L1 in FIG. 4) of the curved region in the front-and-rear direction and the width (W1 in FIG. 4) of the curved region according to the vehicle speed V. In this case, every time the vehicle speed V decreases by a predetermined speed, the change unit 203 shortens either the length of the curved region in the front-and-rear direction or the width of the curved region by a predetermined value to change (reduce) the size of the curved region. Thus, by narrowing the detection region, detection suitable for low-speed traveling becomes possible.

(Storage Unit 205)

The storage unit 205 is composed of a read only memory (ROM) 205a and a random access memory (RAM) 205b. The ROM 205a stores various tables to be used by the change unit 203 in the process of changing the detection region. For example, the ROM 205a stores a table in which the speed of the straddle type vehicle 1, the length (L1 in FIG. 4) of the curved region in the front-and-rear direction, and the width (W1 in FIG. 4) of the curved region have been associated. As compared with processing for changing the size of the curved region by sequential calculation, the change unit 203 can simply and quickly perform processing for changing (enlarging or reducing) the size of the curved region by referring to the table of the ROM 205a.

In addition, the RAM 205b is capable of storing time-series detection information for a predetermined time detected by the various sensors of the travel information detection unit 150. Furthermore, the RAM 205b functions as a work area for the processing executed by the identification unit 202, the change unit 203, and the travel region determination unit 204.

(Notification Control Unit 206)

The notification control unit 206 controls the display of the notification display unit 224 in order to notify the driver that an object has been detected. Here, the rear detection unit 100 executes detection processing in the curved region after the size change by the change unit 203. Then, when an object is detected in the detection region (curved region after the size change) behind the vehicle by the rear detection unit 100, the notification control unit 206 controls the display of the notification display unit 224 to perform control for notifying the driver that the object has been detected by the rear detection unit 100.

(Flow of Processing of Detection Region Control Device 200)

Figure 5:
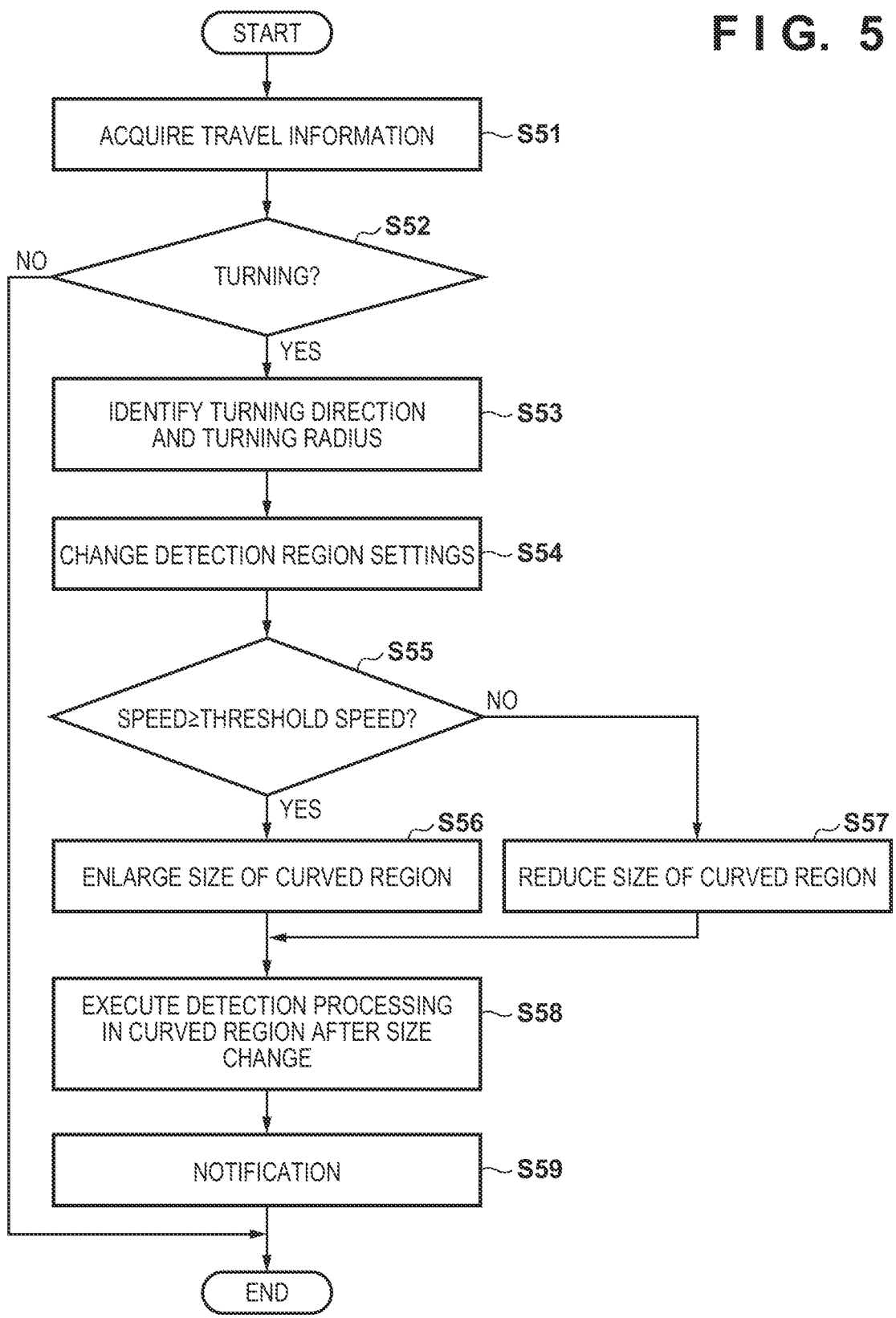
FIG. 5 is a flowchart illustrating the processing of the detection region control device.

Next, a flow of processing of the detection region control device 200 will be described. FIG. 5 is a flowchart illustrating the processing of the detection region control device 200.

In step S51, the interface unit 201 (IF unit) acquires travel information (bank angle, vehicle speed, yaw rate, and steering angle) indicating the travel state of the straddle type vehicle 1 detected by the travel information detection unit 150.

In step S52, the identification unit 202 determines whether the straddle type vehicle 1 is turning on the basis of the travel information (bank angle, vehicle speed, yaw rate, and steering angle). If the identification unit 202 determines that the straddle type vehicle 1 is not turning (S52-No), this processing flow ends. On the other hand, if the identification unit 202 determines that the straddle type vehicle 1 is turning in the determination of the step S52 (S52-Yes), the identification unit 202 advances the processing to step S53.

In the step S53, the identification unit 202 identifies the turning direction and the turning radius of the straddle type vehicle 1 on the basis of the travel information (yaw rate, steering angle, bank angle, and vehicle speed) of the straddle type vehicle 1 acquired by the interface unit 201 (IF unit).

In step S54, the change unit 203 changes straight-ahead-travel detection region settings for the rear detection unit 100 on the basis of the turning direction and the turning radius. As described with reference to FIG. 4, in this step, the change unit 203 changes the shape of the detection region set when traveling straight ahead, in the detection region of the rear detection unit 100, to a curved region having a curved shape according to the turning direction and the turning radius.

In step S55, the travel region determination unit 204 determines whether the straddle type vehicle 1 is traveling at a high speed equal to or higher than the threshold speed, or at a low speed less than the threshold speed on the basis of the comparison between the vehicle speed of the straddle type vehicle 1 and the threshold speed.

If it is determined in step S55 that the straddle type vehicle 1 is traveling at a high speed (S55-Yes), the travel region determination unit 204 advances the processing to step S56.

In step S56, the change unit 203 changes (enlarges) the size of the curved region by increasing at least one of the length (L1 in FIG. 4) of the curved region in the front-and-rear direction, corresponding to the front-and-rear direction (X direction) of the straddle type vehicle 1, and the width (W1 in FIG. 4) of the curved region corresponding to the vehicle width direction (Y direction) of the straddle type vehicle 1.

On the other hand, if it is determined in the step S55 that the straddle type vehicle 1 is traveling at a low speed (S55-No), the travel region determination unit 204 advances the processing to step S57.

Then, in the step S57, the change unit 203 changes (reduces) the size of the curved region by shortening at least one of the length (L1 in FIG. 4) of the curved region in the front-and-rear direction, corresponding to the front-and-rear direction (X direction) of the straddle type vehicle 1, and the width (W1 in FIG. 4) of the curved region corresponding to the vehicle width direction (Y direction) of the straddle type vehicle 1.

In step S58, the rear detection unit 100 executes detection processing in the curved region after the size change. That is, the rear detection unit 100 detects an object in the detection region (curved region after the size change) behind the vehicle. For example, as described with reference to FIG. 4, the other vehicle 410 (FIG. 4) traveling in the curved region 402a behind the straddle type vehicle 1 (self-vehicle) is detected by the rear detection unit 100. When an object is detected in the detection region (curved region after the size change) behind the vehicle by the rear detection unit 100, the processing proceeds to step S59.

Then, in the step S59, the notification control unit 206 controls the display of the notification display unit 224 to perform control for notifying the driver that an object has been detected by the rear detection unit 100.

Second Embodiment

In the first embodiment, the configuration in which the shape of the detection region of the rear detection unit 100 is changed to the curved region having a curved shape according to the turning direction and the turning radius has been described. In a second embodiment, a configuration in which the region pattern corresponding to the turning direction and turning radius is removed from the shape of the detection region set when traveling straight ahead will be described. The configuration of the detection region control device 200 in the second embodiment is similar to the device configuration described in FIG. 2 of the first embodiment.

Figure 6:
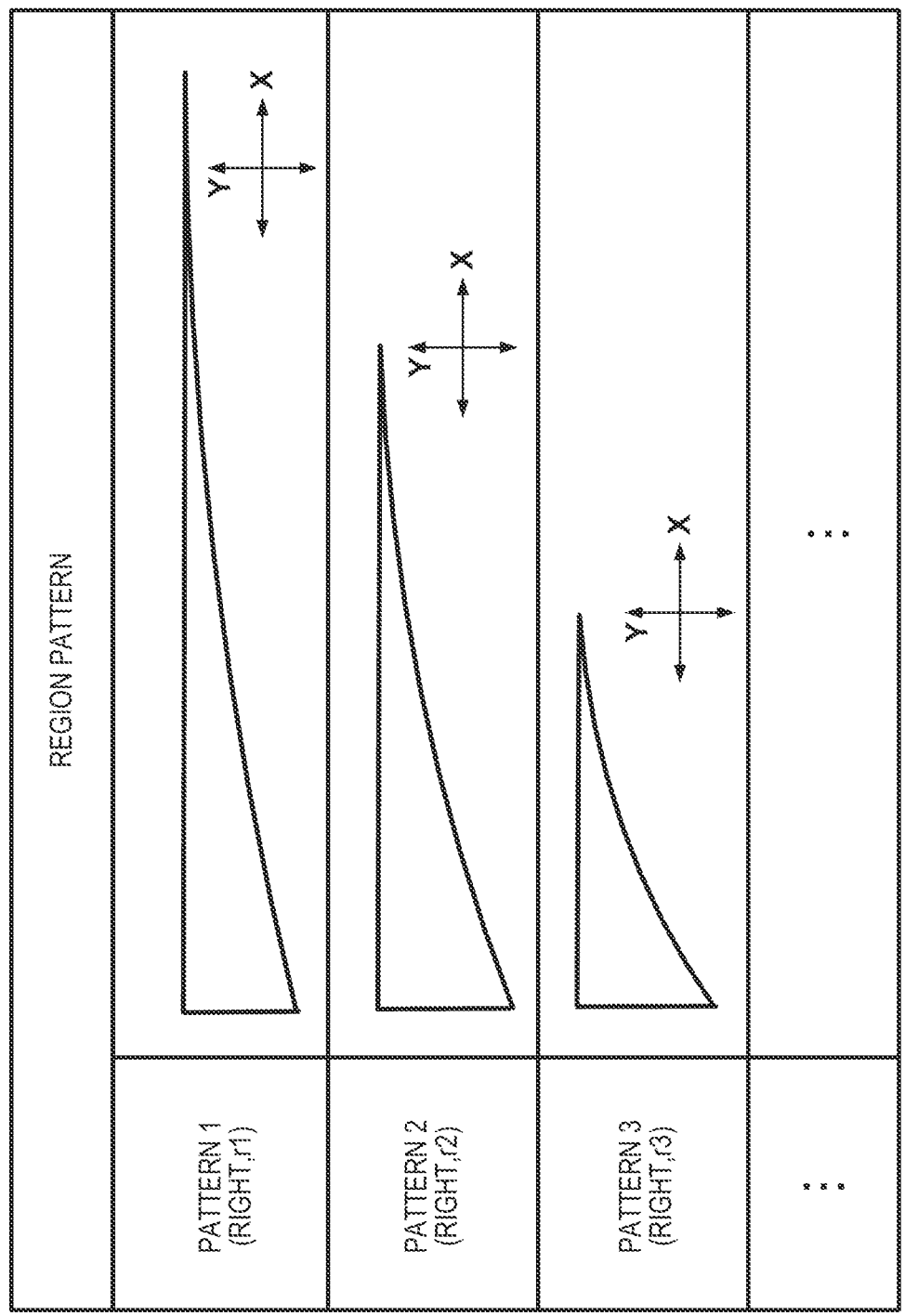
FIG. 6 exemplarily shows a table according to a second embodiment.

In the present embodiment, the ROM 205a stores region patterns according to the turning direction and turning radius. FIG. 6 exemplarily shows a table of the region patterns stored in the ROM 205a, and when the turning direction and turning radius of the straddle type vehicle 1 are identified by the identification unit 202, the change unit 203 can identify the region pattern corresponding to the identified turning direction and turning radius by referring to the table. For example, if the turning radius is r1 in a right turn, the change unit 203 identifies pattern 1, and if the turning radius is r2 in a right turn, the change unit 203 identifies pattern 2. The example table shown in FIG. 6 shows the region pattern in the case of a right turn, but the same applies to a left turn.

In the region pattern, the length in the X direction indicates the length of the region pattern in the front-and-rear direction, corresponding to the front-and-rear direction of the straddle type vehicle 1, and the length in the Y direction indicates the width of the region pattern corresponding to the vehicle width direction of the straddle type vehicle 1. In each region pattern, different values are set for the length in the front-and-rear direction and the width.

If the straddle type vehicle 1 is traveling at a high speed (vehicle speed≥threshold speed), the change unit 203 is capable of changing (enlarging) the size of the curved region by increasing at least one of the length of the curved region in the front-and-rear direction, corresponding to the front-and-rear direction (X direction) of the straddle type vehicle 1, and the width of the curved region corresponding to the vehicle width direction (Y direction) of the straddle type vehicle 1.

Furthermore, if the straddle type vehicle 1 is traveling at a low speed (vehicle speed<threshold speed), the change unit 203 is capable of changing (reducing) the size of the region pattern by shortening at least one of the length of the region pattern in the front-and-rear direction, corresponding to the front-and-rear direction (X direction) of the straddle type vehicle 1, and the width of the region pattern corresponding to the vehicle width direction of the straddle type vehicle 1.

When the region pattern is identified by referring to the table in the ROM 205a, the change unit 203 uses the region pattern to change the shape of the detection region set when traveling straight ahead, in the detection region of the rear detection unit 100, to a region having a shape obtained by removing the region pattern from the shape of the detection region.

Figure 7:
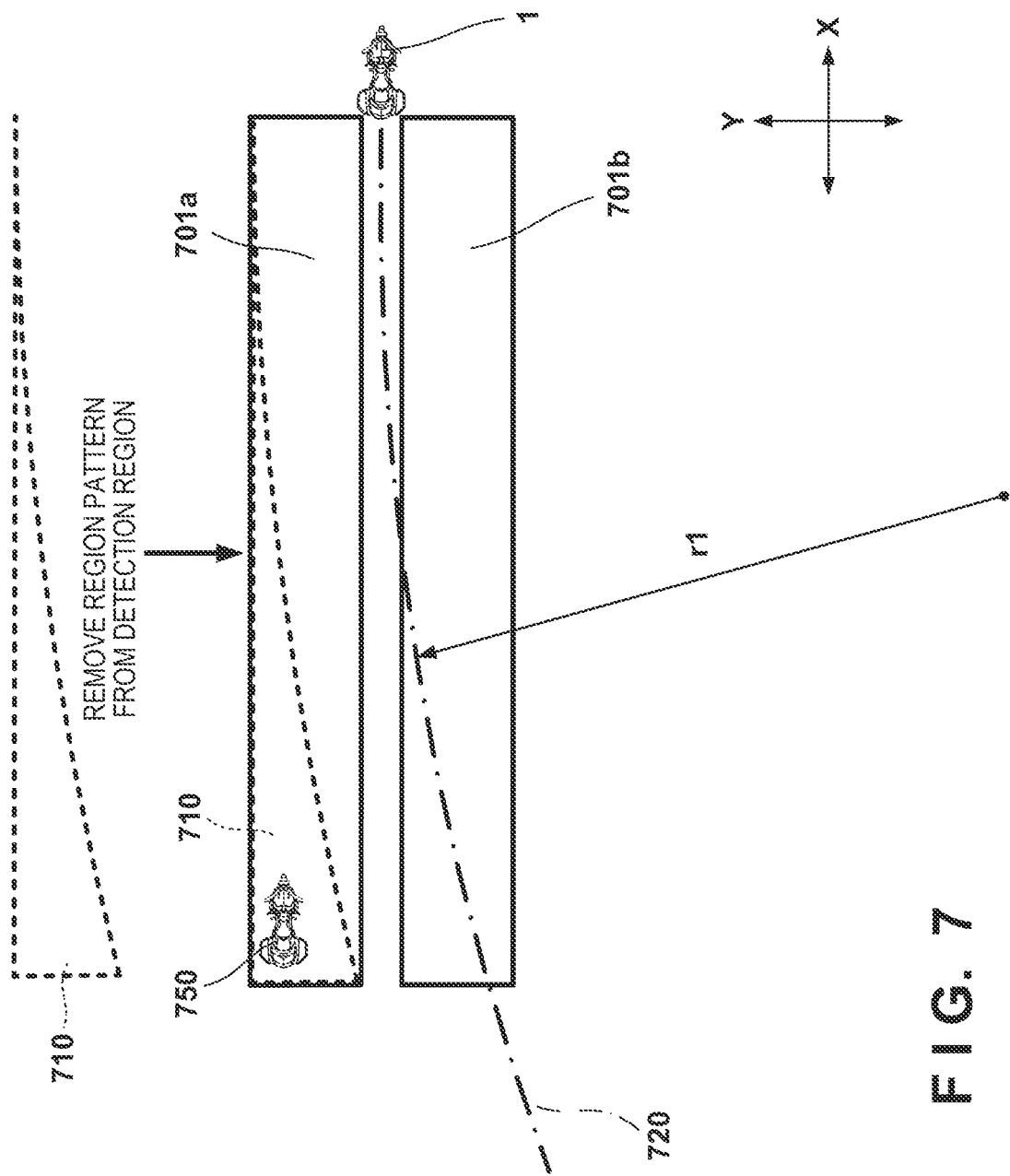
FIG. 7 illustrates the deformation processing of a detection region by the change unit according to the second embodiment.

FIG. 7 illustrates the detection region deformation processing by the change unit 203 according to the second embodiment. FIG. 7 shows an example in which the radars 101 and 102 are arranged on the left and right as the rear detection unit 100 of the straddle type vehicle 1. Note that the arrangement of the radars in FIG. 7 is exemplary, and a configuration in which a single radar is disposed in the rear center of the straddle type vehicle 1 can be similarly applied.

In the example of FIG. 7, similarly to FIG. 4, the shape of the detection region set when traveling straight ahead, in the detection region of the rear detection unit 100, is modeled as a rectangular region shape for simplification.

Detection regions 701a and 701b indicated by solid lines are the detection regions (hereinafter also referred to as the "detection regions before change") set when traveling straight ahead, in the detection region of the rear detection unit 100, and the detection region 701a before change corresponds to the detection region behind the left side of the straddle type vehicle 1 detected by the radar 101. In addition, the detection region 701b before the change corresponds to the detection region behind the right side of the straddle type vehicle 1 detected by the radar 102.

In FIG. 7, a region pattern 710 which is indicated by broken lines corresponds to the pattern 1 (right turn, turning radius r1) shown in the table of FIG. 6. The change unit 203 changes the shape of the detection region before the change to a region (hereinafter, "detection region after the change") having a shape obtained by removing the region pattern 710 from the shape (701*a*) of the detection region. In the example of FIG. 7, when there are a plurality of detection regions (detection region 701*a*, detection region 701*b*) before the change, the region pattern 710 is removed from the detection region 701*a* that is located further outward with respect to the turning path (turning trajectory 720). Note that the example of removing the region pattern from the detection region before the change is not limited to this example, but the region pattern 710 may be removed from the detection region 701*a* and the detection region 701*b* before the change.

In FIG. 7, another vehicle 750 behind the straddle type vehicle 1 (self-vehicle) is located in the region removed from the detection region 701*a* before the change, by the region pattern 710, and therefore is not detected by the rear detection unit 100. According to the present embodiment, the change unit 203 changes the shape of the detection region set when traveling straight ahead, in the detection region of the rear detection unit 100, to a region having a shape obtained by removing the region pattern from the shape of the detection region. Thus, it is possible to prevent the other vehicle 750 traveling at a position away from the turning path (turning trajectory 720) from being erroneously detected as the other vehicle that follows the straddle type vehicle 1 (self-vehicle) during turning.

Summary of Embodiments

Configuration 1. A straddle type vehicle according to the above embodiments is a straddle type vehicle (for example, 1 of FIG. 1) having a rear detection unit (for example, 101, 102 in FIG. 1, 100 in FIG. 2) configured to detect an object in a detection region behind a vehicle, and a notification unit (for example, 224 in FIGS. 1 and 2) configured to notify a driver when the object is detected by the rear detection unit (100, 101, 102), the straddle type vehicle (1) including:
- an acquisition unit (for example, 201 in FIG. 2) configured to acquire travel information of the straddle type vehicle (1);
- an identification unit (for example, 202 in FIG. 2) configured to identify a turning direction and a turning radius of the straddle type vehicle on the basis of the travel information; and
- a change unit (for example, 203 in FIG. 2) configured to change straight-ahead-travel detection region settings for the rear detection unit (100, 101, 102) on the basis of the turning direction and turning radius.

The straddle type vehicle according to Configuration 1 allows a change in detection region settings for the rear detection unit on the basis of the turning direction and the turning radius of the straddle type vehicle. In addition, by changing detection region settings for the rear detection unit on the basis of the turning direction and the turning radius of the straddle type vehicle, it is possible to prevent detection omission and erroneous detection.

Configuration 2. In the straddle type vehicle (1) according to the above embodiments, the change unit (203) changes a shape of the detection region set when traveling straight ahead, in the detection region of the rear detection unit (100, 101, 102), to a curved region (for example, 401*a*, 401*b* in FIG. 4) having a curved shape according to the turning direction and the turning radius.

With the straddle type vehicle according to Configuration 2, detection omission can be prevented by changing the shape of the detection region set when traveling straight ahead to a curved region having a curved shape according to the turning direction and the turning radius.

Configuration 3. The straddle type vehicle (1) according to the above embodiments further includes a storage unit (for example, 205 in FIG. 2) configured to store a region pattern according to the turning direction and turning radius.

The change unit (203) changes a shape (for example, 701*a* in FIG. 7) of the detection region set when traveling straight ahead, in the detection region of the rear detection unit (100, 101, 102), to a region having a shape (for example, 701*a*-710) that is obtained by removing the region pattern (for example, 710 in FIG. 7) from the shape (701*a*) of the detection region.

With the straddle type vehicle according to Configuration 3, erroneous detection can be prevented by changing the shape of the detection region to a region having a shape that is obtained by removing the region pattern from the shape of the detection region.

Configuration 4. In the straddle type vehicle (1) according to the above embodiments, the acquisition unit (201) acquires, as the travel information, a yaw rate of the straddle type vehicle (1) detected by a yaw rate sensor (for example, 153 in FIG. 2) and a steering angle of the straddle type vehicle (1) detected by a steering angle sensor (for example, 154 in FIG. 2), and
- the identification unit (202) identifies the turning direction on the basis of the yaw rate or the steering angle.

With the straddle type vehicle according to Configuration 4, it is possible to identify the direction in which the detection region is curved.

Configuration 5. In the straddle type vehicle (1) according to the above embodiments, the acquisition unit (201) acquires, as the travel information, a bank angle of the straddle type vehicle (1) detected by a bank angle sensor (for example, 151 in FIG. 2) and a vehicle speed of the straddle type vehicle (1) detected by a vehicle speed sensor (for example, 152 in FIG. 2), and
- the identification unit (202) identifies a turning radius in the turning direction acquired on the basis of the bank angle and the vehicle speed as a curvature radius of the curved region.

With the straddle type vehicle according to Configuration 5, the turning radius in the direction in which the detection region is curved can be calculated, and the turning radius in the turning direction can be identified as the curvature radius of the curved region.

Configuration 6. The straddle type vehicle (1) according to the above embodiments further includes a travel region determination unit (for example, 204 in FIG. 2) for determining, on the basis of a comparison between the vehicle speed and a threshold speed, whether the straddle type vehicle is traveling at a high speed equal to or higher than the threshold speed, or at a low speed less than the threshold speed.

The change unit (203) changes a size of the curved region on the basis of a result of the determination.

The straddle type vehicle according to Configuration 6 allows a change in the size of the curved region based on the travel state of the straddle type vehicle.

Configuration 7. In the straddle type vehicle (1) according to the above embodiments, if the straddle type vehicle is traveling at a high speed (for example, vehicle speed V≥threshold speed Vth),
- the change unit (203) changes the size of the curved region (for example, 402*a*, 402*b* in FIG. 4) by increasing at least one of a length (for example, L1 in FIG. 4)

of the curved region in a front-and-rear direction, corresponding to the front-and-rear direction of the straddle type vehicle, and a width (for example, W1 in FIG. 4) of the curved region corresponding to a vehicle width direction of the straddle type vehicle.

With the straddle type vehicle according to Configuration 7, the size of the curved region can be changed to be suitable for high-speed traveling on the basis of the travel state of the straddle type vehicle.

Configuration 8. In the straddle type vehicle (1) according to the above embodiments, if the straddle type vehicle is traveling at a low speed (for example, vehicle speed V<threshold speed Vth), the change unit (203) changes the size of the curved region by shortening at least one of a length (for example, W1 in FIG. 4) of the curved region in a front-and-rear direction, corresponding to the front-and-rear direction of the straddle type vehicle, and a width (for example, W1 in FIG. 4) of the curved region corresponding to a vehicle width direction of the straddle type vehicle.

With the straddle type vehicle according to Configuration 8, the size of the curved region can be changed to be suitable for low-speed traveling on the basis of the travel state of the straddle type vehicle.

Configuration 9. In the straddle type vehicle (1) according to the above embodiments, the identification unit (202) acquires an average bank angle and an average vehicle speed within a set time on the basis of the bank angles and the vehicle speeds sequentially acquired within the set time, and the identification unit (202) corrects the curvature radius of the curved region on the basis of the average bank angle and the average vehicle speed.

With the straddle type vehicle according to Configuration 9, it is possible to correct the curvature radius of the curved region on the basis of the acquired average bank angle and average vehicle speed. This makes it possible to correct the settings of the curved region, which is the detection region of the rear detection unit, according to the turning state.

Configuration 10. A method for controlling a straddle type vehicle according to the above embodiments is a method (for example, FIG. 5) for controlling a straddle type vehicle (for example, 1 in FIG. 1) having a rear detection unit (for example, 101, 102 in FIG. 1, 100 in FIG. 2) configured to detect an object in a detection region behind a vehicle, and a notification unit configured to notify a driver when the object is detected by the rear detection unit (100, 101, 102), the method including:

an acquisition step (for example, S51 in FIG. 5) of acquiring, by an acquisition unit (for example, 201 in FIG. 2), travel information of the straddle type vehicle;

an identification step (for example, S53 in FIG. 5) of identifying, by an identification unit (for example, 202 in FIG. 2), a turning direction and a turning radius of the straddle type vehicle on the basis of the travel information; and a change step (for example, S54 in FIG. 5) of changing, by a change unit (for example, 203 in FIG. 2), straight-ahead-travel detection region settings for the rear detection unit (100, 101, 102) on the basis of the turning direction and turning radius.

With the method for controlling the straddle type vehicle according to Configuration 10, it is possible to change the detection region settings for the rear detection unit on the basis of the turning direction and turning radius of the straddle type vehicle. In addition, by changing detection region settings for the rear detection unit on the basis of the turning direction and the turning radius of the straddle type vehicle, it is possible to prevent detection omission and erroneous detection.

Configuration 11. In the method for controlling the straddle type vehicle according to the above embodiments, in the change step (S54 in FIG. 5), a shape of the detection region set when traveling straight ahead, in the detection region of the rear detection unit (100, 101, 102), is changed to a curved region (for example, 401a, 401b in FIG. 4) having a curved shape according to the turning direction and the turning radius.

With the method for controlling the straddle type vehicle according to Configuration 11, detection omission can be prevented by changing the shape of the detection region set when traveling straight ahead to the curved region having a curved shape according to the turning direction and turning radius.

Configuration 12. The method for controlling the straddle type vehicle according to the above embodiments further includes a pattern acquisition step (for example, 710 in FIG. 7) of acquiring a region pattern from a storage unit (for example, 205 in FIG. 2) for storing the region pattern according to the turning direction and turning radius.

In the change step, a shape of the detection region set when traveling straight ahead, in the detection region of the rear detection unit (100, 101, 102), is changed to a region having a shape (for example, 701a-710) that is obtained by removing the region pattern from the shape of the detection region.

With the method for controlling the straddle type vehicle according to Configuration 12, erroneous detection can be prevented by changing the shape of the detection region to a region having a shape obtained by removing the region pattern from the shape of the detection region.

Configuration 13. A storage medium storing a program according to the above embodiments causes a computer to execute each step of the method for controlling the straddle type vehicle according to any one of Configurations 10 to 12.

According to the storage medium according to Configuration 13, it is possible to provide a storage medium storing a program for causing a computer to execute each step of the method for controlling the straddle type vehicle.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

The present invention is not limited to the above-described embodiments, and various changes and modifications can be made without departing from the spirit and scope of the present invention. Therefore, in order to make the scope of the present invention public, the following claims are attached.

What is claimed is:

1. A straddle type vehicle having a rear detection unit configured to detect an object in a detection region behind a vehicle, and a notification unit configured to notify a driver when the object is detected by the rear detection unit, the straddle type vehicle comprising:

an acquisition unit configured to acquire travel information of the straddle type vehicle;

an identification unit configured to identify a turning direction and a turning radius of the straddle type vehicle on the basis of the travel information; and a change unit configured to change straight-ahead-travel detection region settings for the rear detection unit on the basis of the turning direction and turning radius, wherein the change unit changes a shape of the detection region set when traveling straight ahead, in the detection region of the rear detection unit, to a curved region having a curved shape according to the turning direction and the turning radius.

2. The straddle type vehicle according to claim 1, wherein the acquisition unit acquires, as the travel information, a yaw rate of the straddle type vehicle detected by a yaw rate sensor and a steering angle of the straddle type vehicle detected by a steering angle sensor, and the identification unit identifies the turning direction on the basis of the yaw rate or the steering angle.

3. The straddle type vehicle according to claim 1, wherein the acquisition unit acquires, as the travel information, a bank angle of the straddle type vehicle detected by a bank angle sensor and a vehicle speed of the straddle type vehicle detected by a vehicle speed sensor, and the identification unit identifies a turning radius in the turning direction acquired on the basis of the bank angle and the vehicle speed as a curvature radius of the curved region.

4. The straddle type vehicle according to claim 3, further comprising a travel region determination unit for determining, on the basis of a comparison between the vehicle speed and a threshold speed, whether the straddle type vehicle is traveling at a high speed equal to or higher than the threshold speed, or at a low speed less than the threshold speed, wherein the change unit changes a size of the curved region on the basis of a result of the determination.

5. The straddle type vehicle according to claim 4, wherein, if the straddle type vehicle is traveling at a high speed, the change unit changes the size of the curved region by increasing at least one of a length of the curved region in a front-and-rear direction, corresponding to the front-and-rear direction of the straddle type vehicle, and a width of the curved region corresponding to a vehicle width direction of the straddle type vehicle.

6. The straddle type vehicle according to claim 4, wherein, if the straddle type vehicle is traveling at a low speed, the change unit changes the size of the curved region by shortening at least one of a length of the curved region in a front-and-rear direction, corresponding to the front-and-rear direction of the straddle type vehicle, and a width of the curved region corresponding to a vehicle width direction of the straddle type vehicle.

7. The straddle type vehicle according to claim 3, wherein the identification unit acquires an average bank angle and an average vehicle speed within a set time based on the bank angles and the vehicle speeds sequentially acquired within the set time, and the identification unit corrects the curvature radius of the curved region on the basis of the average bank angle and the average vehicle speed.

8. A straddle type vehicle having a rear detection unit configured to detect an object in a detection region behind a vehicle, and a notification unit configured to notify a driver when the object is detected by the rear detection unit, the straddle type vehicle comprising:

an acquisition unit configured to acquire travel information of the straddle type vehicle;

an identification unit configured to identify a turning direction and a turning radius of the straddle type vehicle on the basis of the travel information; and a change unit configured to change straight-ahead-travel detection region settings for the rear detection unit on the basis of the turning direction and turning radius, a storage unit configured to store a region pattern according to the turning direction and turning radius, wherein the change unit changes a shape of the detection region set when traveling straight ahead, in the detection region of the rear detection unit, to a region having a shape that is obtained by removing the region pattern from the shape of the detection region.

9. A method for controlling a straddle type vehicle having a rear detection unit configured to detect an object in a detection region behind a vehicle, and a notification unit configured to notify a driver when the object is detected by the rear detection unit, the method comprising:

an acquisition step of acquiring, by an acquisition unit, travel information of the straddle type vehicle;

an identification step of identifying, by an identification unit, a turning direction and a turning radius of the straddle type vehicle on the basis of the travel information; and a change step of changing, by a change unit, straight-ahead-travel detection region settings for the rear detection unit on the basis of the turning direction and turning radius, wherein, in the change step, a shape of the detection region set when traveling straight ahead, in the detection region of the rear detection unit, is changed to a curved region having a curved shape according to the turning direction and the turning radius.

10. A non-transitory storage medium storing a program for causing a computer to execute each step of the method for controlling the straddle type vehicle according to claim 9.

11. A method for controlling a straddle type vehicle having a rear detection unit configured to detect an object in a detection region behind a vehicle, and a notification unit configured to notify a driver when the object is detected by the rear detection unit, the method comprising:

an acquisition step of acquiring, by an acquisition unit, travel information of the straddle type vehicle;

an identification step of identifying, by an identification unit, a turning direction and a turning radius of the straddle type vehicle on the basis of the travel information;

a change step of changing, by a change unit, straight-ahead-travel detection region settings for the rear detection unit on the basis of the turning direction and turning radius; and a pattern acquisition step of acquiring a region pattern from a storage unit for storing the region pattern according to the turning direction and turning radius, wherein in the change step, a shape of the detection region set when traveling straight ahead, in the detection region of the rear detection unit, is changed to a region having a shape that is obtained by removing the region pattern from the shape of the detection region, wherein, in the change step, a shape of the detection region set when traveling straight ahead, in the detection region of the rear detection unit, is changed to a curved region having a curved shape according to the turning direction and the turning radius.

\* \* \* \* \*